United States Patent
Johns et al.

(10) Patent No.: US 9,934,393 B2
(45) Date of Patent: Apr. 3, 2018

(54) TRANSPARENT NAMESPACE-AWARE MECHANISM FOR ENCRYPTED STORAGE OF DATA WITHIN WEB APPLICATIONS

(71) Applicants: Martin Johns, Karlsruhe (DE); Sebastian Lekies, Karlsruhe (DE)

(72) Inventors: Martin Johns, Karlsruhe (DE); Sebastian Lekies, Karlsruhe (DE)

(73) Assignee: SAP SE, Walldorf (DE)

( * ) Notice: Subject to any disclaimer, the term of this patent is extended or adjusted under 35 U.S.C. 154(b) by 258 days.

(21) Appl. No.: 14/691,959

(22) Filed: Apr. 21, 2015

(65) Prior Publication Data

US 2016/0314303 A1 Oct. 27, 2016

(51) Int. Cl.
G06F 11/30 (2006.01)
G06F 21/62 (2013.01)

(52) U.S. Cl.
CPC .................. *G06F 21/6209* (2013.01)

(58) Field of Classification Search
CPC .................. G06F 21/602; G06F 21/604
See application file for complete search history.

(56) References Cited

U.S. PATENT DOCUMENTS

| | | | |
|---|---|---|---|
| 9,117,062 B1* | 8/2015 | Fitch | G06F 21/30 |
| 9,225,690 B1* | 12/2015 | Fitch | H04L 63/0428 |
| 9,288,199 B1* | 3/2016 | Winn | H04L 63/08 |
| 2006/0064463 A1* | 3/2006 | Chan | G06F 21/6218 |
| | | | 709/206 |
| 2009/0069052 A1* | 3/2009 | Jain | G06K 19/07739 |
| | | | 455/558 |
| 2010/0153489 A1* | 6/2010 | Ito | G06Q 30/02 |
| | | | 709/203 |
| 2011/0055559 A1* | 3/2011 | Li | G06F 21/6218 |
| | | | 713/165 |
| 2011/0296172 A1* | 12/2011 | Fu | H04L 9/0825 |
| | | | 713/156 |
| 2011/0314290 A1* | 12/2011 | Fort | G06F 21/31 |
| | | | 713/176 |
| 2012/0323717 A1* | 12/2012 | Kirsch | G06Q 20/0855 |
| | | | 705/26.1 |
| 2014/0129835 A1* | 5/2014 | Suryavanshi | H04L 51/14 |
| | | | 713/168 |

(Continued)

OTHER PUBLICATIONS

Bidelmanm, "A Beginners Guide to Using the Application Cache," retrieved from the Internet URL: <http://www.html5rocks.com/en/tutorials/appcache/beginner/ >, Jun. 18, 2010, 10 pages.

(Continued)

*Primary Examiner* — Khoi Le
(74) *Attorney, Agent, or Firm* — Fish & Richardson P.C.

(57) ABSTRACT

Implementations of the present disclosure include methods, systems, and computer-readable storage mediums for providing data security in web applications operating offline, and actions include receiving a request from a user of a web application during offline use of the web application in a web browser, the request implicating a data item, receiving an offline password from the user, decrypting an encrypted offline key to provide an offline key, and selectively using the offline key to process the data item based on a data protection policy stored in storage of the web browser and a protection level assigned to the data item.

17 Claims, 7 Drawing Sheets

(56) References Cited

U.S. PATENT DOCUMENTS

2014/0304766 A1* 10/2014 Livne .................. H04L 63/1433
                                                            726/1
2016/0205185 A1*  7/2016 Gampel ................. H04L 67/02
                                                          709/218

OTHER PUBLICATIONS

Hanna et al., "The Emperor's New APIs: On the (In) Secure Usage of New Client-side Primitives," in Web 2.0 Security and Privacy (W2SP 2010), 2010, 10 pages.
Hickson, Web Storage, W3C Candidate Recommendation Dec. 8, 2011, retrieved from the Internet URL:< http://www.w3.org/TR/webstorage/ >, Dec. 2011, 20 pages.
Janc, "Rootkits in your Web application," 28th Chaos Communication Congress, retrieve from the Internet URL:< http://events.ccc.de/congress/2011/Fahrplan/events/4811.en.html >, Dec. 2011, 2 pages.
Kamkar, "Evercookie—never forget," retrieved from the Internet URL:< http://samy.pl/evercookie/ >, Oct. 11, 2010, 5 pages.
Lekies et al., "Lightweight Integrity Protection for Web Storage-driven Content Caching," SAP Research, in Web 2.0 Security and Privacy (W2SP 2012), 2012, 8 pages.
Nyman, "Saving images and files in localStorage," retrieved from the Internet URL:< http://hacks.mozilla.org/2012/02/saving-images-and-files-in-localstorage/ >, Feb. 2012, 40 pages.
Souders, App cache & localStorage survey, retrieved from the Internet URL:< http://www.stevesouders.com/blog/2011/09/26/app-cache-localstorage-survey/ >, Sep. 2011, 5 pages.

* cited by examiner

TRANSPARENT NAMESPACE-AWARE MECHANISM FOR ENCRYPTED STORAGE OF DATA WITHIN WEB APPLICATIONS

BACKGROUND

The World Wide Web (the "web"), an information system of interlinked hypertext documents that are accessed using the Internet, is in a transitional phase evolving from a mechanism to transfer static documents (e.g. written using hypertext mark-up language (HTML)) towards a sophisticated platform for large-scale Web applications. This development has driven, at least in part, by the introduction of novel application program interfaces (APIs) (e.g., HTML5 JavaScript APIs) and related technologies.

One technology that is of particular significance to web applications (e.g., business applications) is the HTML5 Application Cache. The Application Cache ("App-Cache") enables a web browser to reliably make web applications available when users are offline. That is, even if no network connection is available, an App-Cache-enabled web application can be utilized to view or process data (e.g., business critical data). In order to enable such a scenario, the required data is stored on the client-side (e.g., the user device). Because traditional web applications were not able to store data within the web browser, the so-called HTML5 Web Storage API was introduced to enable persistent client-side data storage. Such a storage mechanism can be used for the above-discussed offline scenarios, as well as for caching of larger amounts of data.

From a security point of view, the client-side storage of confidential data is very critical. By default, data that is stored within the Web Storage API is kept by the web browser for an unlimited amount of time, and is accessible to anyone who has physical access to the user device that the web browser is running on. While in the traditional web paradigm, the server is in control of the data and is able to grant or revoke access to the data at any time, data access is uncontrollable in the novel client-side case. Consequently, using the Web Storage API for such confidential data embodies a tradeoff between functionality and security. That is, either the web application waives the usage of modern technologies, or gives up control of its data, neither of which is acceptable.

Another issue is insufficient separation of data within the Web Storage API. By default, each origin (defined by protocol, port and domain) receives one dedicated storage area to store and retrieve data. To achieve this, the data is stored in a key-value fashion. Consequently, if a web application attempts to store an item, the web application selects a unique key and advises the Web Storage API to store the data under the key. If a web application seeks to retrieve the data, the web application uses the key to tell the Web Storage API which data is to be provided.

In simple web applications, this mechanism works well. However, in large-scale business applications, this behavior can lead to problems. For example, in large-scale applications there is often not only one web application running under the same origin, but potentially dozens of applications that are developed by different development teams. Consequently, it is relatively common that two applications are using the same key to store different kinds of data within the Web Storage API. As all applications are loaded from the same origin, the different applications are overwriting each other's data.

Besides this problem, there may be several standard components using these storage facilities. For example, a standard search field could use the Web Storage API to cache the last search terms or results in order to speed up the user experience. In order to benefit from code reuse, such components are developed once and then reused whenever such a functionality is needed. In large-scale applications these standard components are used extensively. Because they are based on the same code and often use the same hardcoded keys for storing data, these components also overwrite each other's data.

SUMMARY

Implementations of the present disclosure include computer-implemented methods for providing data security in web applications operating offline, the methods being performed by one or more processors. In some implementations, methods include actions of receiving a request from a user of a web application during offline use of the web application in a web browser, the request implicating a data item, receiving an offline password from the user, decrypting an encrypted offline key to provide an offline key, and selectively using the offline key to process the data item based on a data protection policy stored in storage of the web browser and a protection level assigned to the data item.

These and other implementations can each optionally include one or more of the following features: selectively using the offline key includes: determining that the data item is to be written to the storage of the web browser and that the protection level of the data item is designated as medium-protection, and in response: encrypting the data item using the offline key to provide an encrypted data item, appending a suffix to the encrypted data item, the suffix indicating that the encrypted data item is written during offline use of the web application, and storing the encrypted data item with the suffix in the storage; selectively using the offline key includes: determining that the data item is to be written to the storage of the web browser and that the protection level of the data item is designated as low-protection, and in response: encrypting the data item using the offline key to provide an encrypted data item, and storing the encrypted data item in the storage; selectively using the offline key includes: determining that the data item is to be written to the storage of the web browser and that the protection level of the data item is designated as public, and in response: storing the data item in the storage; selectively using the offline key includes: determining that the data item is to be read from the storage of the web browser and that the protection level of the data item is designated as low-protection, and in response: retrieving an encrypted data item from the storage, and decrypting the encrypted data item using the offline key to provide the data items; during an online use of the web application, the offline key is received from a server hosting the web application, the offline key is encrypted using the offline password to provide the encrypted offline key, and the encrypted offline key is stored in the storage of the web browser; and actions further include receiving the data protection policy from a server hosting the web application, the data protection policy defining respective protection levels assigned to respective data items.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to a mechanism that provides security guarantees, while preserving the benefits of use cases and technologies. More particularly, and as discussed in detail herein, implementations of the present disclosure are directed to providing data security in web applications operating offline. In some examples, requested data items are selectively processed using an offline password that is provided by decrypting an encrypted offline password using an offline password provided by a user. In some examples, a data item is selectively processing using the offline password based on a protection level assigned to the data item in data protection policy stored in storage of the web browser.

Implementations of the present disclosure also provide a namespace concept that transparently (for the application and the developer) assigns namespaces to different applications and prevents keys from being overwritten.

Figure 1:
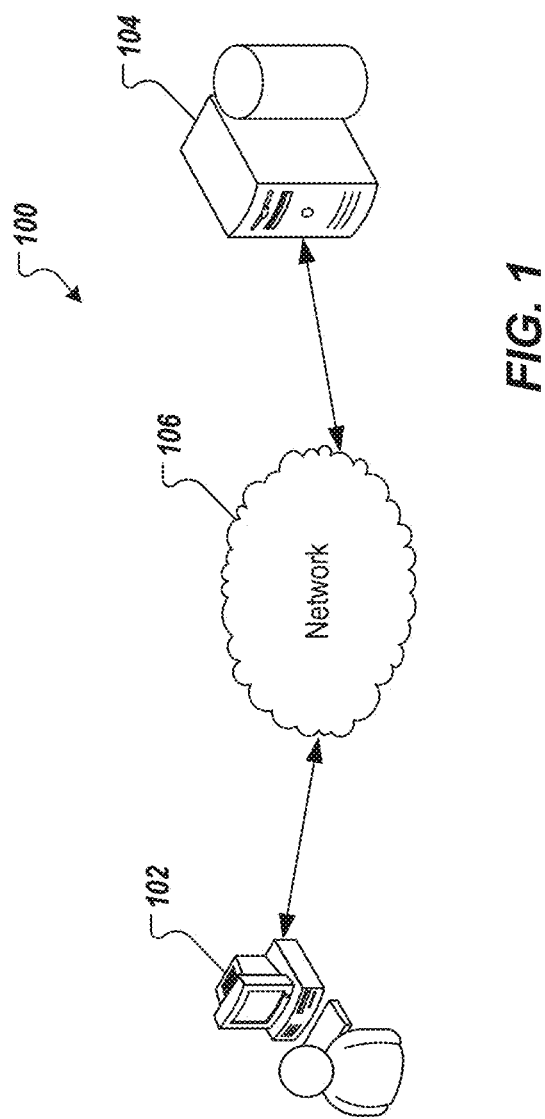
FIG. 1 depicts an example system architecture in accordance with implementations of the present disclosure.

FIG. 1 depicts an example system architecture 100 in accordance with implementations of the present disclosure. The example system architecture 100 includes a client-side computing device (a client) 102, a server-side computing device (a server) 104, and a network 106. In general, the computing device 102 can include any appropriate type of computing device, which can include a desktop computer, a laptop computer, a handheld computer, a tablet computing device, a smartphone, a personal digital assistant (PDA), a cellular telephone, a media player, a navigation device, an email device, or any appropriate combination of any two or more of these example computing devices. In the example system architecture 100 of FIG. 1, the computing device 102 is depicted as a desktop computer.

The computing device 102 can communicate with the server 104 over the network 106. The network 106 can include a large computer network, such as a local area network (LAN), a wide area network (WAN), the Internet, a cellular network, or a combination thereof, connecting any number of computing devices, fixed computing devices and servers. The server 104 can include one or more computing devices and one or more machine-readable repositories, or databases.

For purposes of illustration, and as discussed in further detail below, a user can use the computing device 102 to interact with a web-based application (web application) hosted by the server 104. In some examples, the web application can be provided using one or more web pages of a website that is hosted by the server 104. In some examples, interaction between the computing device 102 and the server 104 includes executing a web browser on the computing device 102 to display the one or more web pages of the web application. In some examples, the one or more web pages include interaction elements such as dialogue boxes and clickable buttons that enable the user to provide input to the web page.

In some implementations, and as described herein, the user can interact with the web application using the computing device 102, while online. In some examples, online can include the computing device 102 and the server 104 communicating with one another (e.g., during a session) through the network 106. In some implementations, and as also described herein, the user can interact with the web application using the computing device 102, while offline. In some examples, offline can include an absence of communication, or an absence of the ability to communicate, between the computing device 102 and the server 104. In some examples, a web application that is available online or offline can use an application cache (e.g., the HTML5 Application Cache ("App-Cache")). More particularly, an App-Cache-enabled web application can be utilized to view or process data (e.g., business critical (confidential) data) when offline. In order to enable such a scenario, the to-be-accessed data is stored on the computing device 102. In some examples, the HTML5 Web Storage API is used for persistent client-side data storage.

Implementations of the present disclosure will be described in further detail herein with reference to an example technical discussion of web storage. Web Storage is a mechanism that enables Javascript to store structured data within the user's web browser. In this manner, Web storage is an umbrella term for related functionalities: Session Storage (SessionStorage) and Local Storage (LocalStorage). Each of these storage types implements the same API and adheres to the same security restrictions. The underlying storage mechanism is implemented using a key-value scheme that enables storage, retrieval and deletion of data (e.g., a string value) based on a respective key. The example listing below provides an example:

Listing 1: Example Use of LocalStorage

```
<script>
    //Set Item
    localStorage.setItem("foo","bar");
    ...
    //Get Item
    var testVar = localStorage.getItem("foo");
```

Listing 1: Example Use of LocalStorage

```
...
//Remove Item
localStorage.removeItem("foo");
...
//Clear all
localStorage.clear( );
</script>
```

In general, access to data stored within web storage is limited to same origin resources only. For example, each website gets one storage area assigned to it, so that data of different origins is strictly separated. Therefore, data stored by a website on "a.net" is only accessible to other resources from a.net, but not from "b.net."

SessionStorage was designed for transaction-based scenarios, in which a user is able to simultaneously carry out the same transaction in multiple web browser windows. Within the same window, data can be stored and retrieved from the storage by any web page loaded from the same origin. A web page loaded within another window possesses its own storage and hence is not able to access the data from another window.

LocalStorage differs from SessionStorage with respect to scope and lifetime. As opposed to SessionStorage, data within the LocalStorage can also be accessed across different web browser windows by same origin web pages. Furthermore, LocalStorage is persistent across sessions, while data within SessionStorage is discarded whenever the corresponding session is closed. It can be noted that the lifetime of a session is unrelated to the lifetime of the corresponding user agent process, as the user agent may support resuming sessions after restart.

Example usage patterns for web storage include, among others, state-keeping in offline situations and using web storage for caching. With regard to state-keeping for offline applications, some web browsers enable web applications to provide offline capabilities, as introduced above. In some examples, a web application can explicitly specify which of its resources should be kept in the web browser's application cache. This can be achieved using a dedicated manifest file that lists the uniform resource locators (URLs) of the respective to-be-stored resources. In situations, in which the web browser is disconnected form the network, these files, which were stored earlier, are loaded and rendered from the application cache during offline use of the web application. However, because no network connection is present to propagate the user's actions (e.g., at the computing device 102) to the web server (e.g., the server 104), all actions, which may have a permanent effect, are temporarily stored in the web browser until the browser reenters the online mode. Web storage can be used to store such information.

With regard to using web storage for controlled caching of web content, the caching facilities of some web browsers only enable caching of the content of full hypertext transfer protocol (HTTP) responses (e.g., complete documents, scripts, or images). Furthermore, the actual caching process is transparent to the application and is not under its control. Consequently, in situations, in which the need occurs to either cache only sub-parts of HTML documents or in which the application needs closer control with respect to the cached content and its usage, web storage provides the needed capabilities. This is particularly relevant in the context of web applications that, for example, target mobile devices, which, unlike their modern desktop counterparts, may have to deal with limited network bandwidth and/or high network latency.

As introduced above, the Web Storage API is exposed to the JavaScript space through set of global JavaScript functions that can be utilized by any JavaScript running in the context of the corresponding web page. Due to the dynamic nature of JavaScript all functions can be overwritten with custom functions.

In accordance with implementations of the present disclosure, a namespace concept is provided, which transparently (for the application and the developer) assigns namespaces to different applications and prevents keys from being overwritten. In some examples, the namespace concept of the present disclosure is associated with a plurality of design goals. A first design goal (NS-DG1) includes separation of different applications, in which multiple web applications loaded from the same origin run separately from each other, in the context of the Web Storage API. Even if those web applications use the same keys to store their values, they should not overwrite each other's data. A second design goal (NS-DG2) includes standard web browser features, in which the namespace concept is to be implemented without the need for web browser modifications. In this manner, the namespace concept of the present disclosure can be immediately adopted by web applications without the involvement of web browser vendors. A third design goal (NS-DG3) includes transparency, in which the namespace concept should be as transparent as possible. Ideally, the namespace concept is implemented in a way that enables a legacy application to adopt the concept with no, or minimal code adaptation.

The namespace concept of the present disclosure fulfills NS-DG1. More particularly, and in accordance with the present disclosure, each application or document (e.g., HTML document) is assigned a unique namespace. In this manner, different applications and/or documents are separated. Whenever a particular application/document attempts to store or fetch data for a specific web storage key, the web storage key is prepended with the respective namespace. Consequently, even if multiple applications, for example, attempt to store data under the same web storage keys, the web storage keys are prepended with respective namespaces. In this manner, the web storage keys differ from each other across the multiple application. Consequently, it is not possible for two applications with different namespaces to access or overwrite each other's data.

In accordance with implementations of the present disclosure, a library extends the native functionality of the LocalStorage API and the SessionStorage API. In some examples, the APIs are extended by overwriting the native capabilities and implemented a standard web storage interface. The example listing below provides an example of overwriting the native capabilities:

Listing 2: Wrapping of Local Storage

```
[...]
var LocalStorageWrapper =
    function LocalStorageWrapper( ) { }
LocalStorageWrapper.prototype = {
    [...] //implementation of Storage Interface
}
Object.defineProperty(window, "localStorage", {
    value: new LocalStorageWrapper( ),
    writeable: true,
    configurable: true,
```

-continued

Listing 2: Wrapping of Local Storage

```
        enumerable: true
    });
    [...]
```

The example listing below provides an example of implementing the standard web storage interface:

Listing 3: Web Storage Interface Description Language (IDL)

```
interface Storage {
    readonly attribute unsigned long length;
    getter DOMString key(in unsigned long index);
    getter any getItem(in DOMString key);
    setter creator void setItem(in DOMString key,
        in any data);
    deleter void removeItem(in DOMString key);
    void clear( );
};
```

In accordance with the present disclosure, the library can be used in exactly the same manner as the Web Storage API. In this manner, code adaptation of legacy code of the web application is not required. A web application developer need not even be aware that the namespace concept of the present disclosure is active on the client-side. Instead, a script (e.g., Javascript) is added to each web page at the client-side, which script is used to assign a namespace to the respective web page. To achieve this, the library adds an additional method to the Web Storage API, which method can be called setNameSpace, for example. In some examples, the setNameSpace method (function) receives a string parameter that represents the namespace for the particular web page for subsequent calls to the LocalStorage API or the SessionStorage API. Instead of storing values under the application-specific keys (web storage keys), implementations of the present disclosure use a combination of namespace and key to store a particular value. The example listing below provides an example of retrieving and storing values:

Listing 4: Namespace-aware Implementation of getItem and setItem

```
function getItem(key) {
    var nsAwareKey = namespace + key;
    return originalStorage.getItem(nsAwareKey);
}
function setItem(key, data) {
    var nsAwareKey = namespace + key;
    return originalStorage.setItem(nsAwareKey, data);
}
```

Although the namespace mechanism for storing and receiving data is exactly the same (from the developer's/application's point of view), the namespace mechanism separates applications from each other and limits access to only the keys residing within the configured namespace. Consequently, namespace mechanism of the present disclosure hinders standard components or different applications from accessing each other's data. Further, the function wrapping techniques fulfill NS-DG2 and NS-DG3.

As introduced above, implementations of the present disclosure further provide an encryption scheme to provide security guarantees, while preserving the benefits of use cases and technologies. In some examples, the encryption scheme of the present disclosure is associated with a plurality of design goals. A first design goal (ENC-DG1) is transparency, such that the encryption scheme should be easy to use and not deviate from standard usage of LocalStorage. In this manner, training is reduced to a minimum and legacy applications are supported out of the box. Ideally, the library used for the encryption scheme should be transparent for the application developer. A second design goal (ENC-DG2) is directed to storage that provides benefits of traditional caching and offline usage. In this manner, relatively large amounts of data can be stored across a web browsing session. A third design goal (ENC-DG3) is to ensure the privacy of the data, even if a malicious adversary gains access to the web browser. A fourth design goal (ENC-DG4) is that the encryption scheme works with standard web browser features.

In accordance with implementations of the present disclosure, the encryption scheme transparently encrypts all data values, before they are written into the web browser's local storage. In some implementations, the encryption is done using symmetrical cryptography (e.g., advanced encryption standard (AES)) with a key that is tied to the identity of the user (e.g., a master key that is user-specific). In some examples, the key is retrieved from the server when the user logs onto the web application. Accordingly, to receive the master key, the user needs to be online. Because web browser storage is to be used during offline usage of the web application, the encryption scheme of the present disclosure uses a second key, referred to as an offline key, as well as an offline password, both of which are described in further detail herein. In this manner, and as described in further detail herein, the user's data is safe, even if the web browser can be accessed by an untrusted party (e.g., the computing device is stolen), because all entries in the web browser's storage are encrypted and the adversary (untrusted party) has no access to the encryption keys.

The encryption scheme of the present disclosure relies on a plurality of credentials: the master key, the offline key and the offline password. In some implementations, the master key is used to write all data that is marked to be of high-privacy (discussed in further detail below). In some implementations, the offline key: protects data that is either of lesser privacy value (e.g., cached non-user specific data) or new data that is entered by the user in the offline scenario. In this manner, a user can enter new data of high-privacy (e.g., drafting a new email, creating a new spreadsheet), even when the user is offline and cannot retrieve the master key. In some implementations, the offline password is used to protect the offline key. In some examples, the offline key is stored in the web browser's storage, and is encrypted using the offline password as the encryption secret. In an offline scenario, the user is prompted to enter is offline password. Using the offline password, the offline key is retrieved from the web browser's storage and decrypted. If the entered password is correct, the resulting offline key can be used to access the offline-enabled data items, discussed below.

Due to the nature of the two encryption keys (the master key and the offline key), there is differentiation between online and offline scenarios with respect to relative protection levels of the data items. Accordingly, implementations of the present disclosure provide a plurality of protection levels (e.g., based on a data security policy). Example protection levels include: high-protection data, medium-protection data, low-protection data, and public data. In some examples, high-protection data can only be read and written, if the master key is present (e.g., only in online scenarios). In some examples, medium-protection data can only be read with the master key (online scenario), but can be temporarily written using the offline key (offline scenario). For example, the user types an email, while offline. In some examples, low-protection data can be read and written using the offline key (offline scenario). In some examples, public data can be read/written without encryption (e.g., public JavaScript or HTML code that is persisted on the client-side for caching purposes).

In some implementations, the protection levels of the data items are tied to their respective identifiers. In some examples, the identifier is provided as the key of the key/value store used by the web browser. In some examples, a mapping between identifier and protection level is communicated to the web browser on first initialization of the web application and is persisted (e.g., in JavaScript Object Notation (JSON) in the web browser's storage).

Implementations of the present disclosure provide a plurality of processes for realizing the encryption scheme described herein. Example processes include enrollment, initialization, working online, working offline, and updating data.

In some implementations, enrollment is performed to establish the encryption credentials and can include key generation and setting of the offline password. During key generation, the encryption keys are generated. In some examples, key generation is performed on the server-side, and the resulting keys are stored on a server-side database. The user is prompted to set an offline password, and the offline password is stored in the server-side database. In some examples, enrollment is performed the first time that the user enrolls to access and use the web application. In some examples, enrollment is performed when the user requests access to a part of the web application that uses the client-side persistence.

In some implementations, initialization includes credential communication, preparing for offline use, and setting up a data protection policy. In some examples, credential communication includes transmitting the master key, the offline key and the offline password to the web browser over a network (e.g., using XMLHttpRequest). In some examples, the master key, the offline key and the offline password are stored in the web browser's SessionStorage. This manner, the master key, the offline key and the offline password are available to the web application's JavaScript during the session, but are discarded as soon as the web browser terminates or the session ends. In some examples, preparing for offline enables offline usage of the web application by storing the offline key in the web browser. For this, the offline key is encrypted using the offline password. The resulting ciphertext (encrypted offline key) is stored in the web browser's storage. In some examples, the data protection policy (DPP) maps the data items to their respective protection level. Accordingly, setting up the DPP includes retrieving the DPP from the server, and storing the DPP in the web browser's storage. In some examples, initialization is performed when the user access the web application with a fresh web browser (e.g., a web browser that has not yet been used with the web application and, thus, has not yet persisted data in the LocalStorage.

After the initialization has been performed, all necessary information is present in the web browser to conduct transparent encryption. More particularly, the master key and the offline key are available and, using the DPP, the storage API can chose the matching key for each individual data item.

In some implementations, working online includes key selection, key access, and data access (reading/writing).

With regard to key selection, a matching key (e.g., master key or offline key) is selected for a particular data item based on the protection level of the data item. In some examples, the protection level of the data item is determined by cross-referencing the identifier with the DPP. In some examples, the master key is selected as the matching key for high-protection and medium-protection data items, the offline key is selected as the matching key for low-protection data items (no key is selected for public data). With regard to key access, the matching key (e.g., the master key or the offline key is retrieved from the web browser SessionStorage. If the requested key is not yet present in the SessionStorage, the master key, the offline key and the offline password are requested by the web browser over the network (e.g., using an XMLHttpRequest). The master key, the offline key and the offline password are received at the client-side and are stored in the web browser's SessionStorage. In this manner, the master key, the offline key and the offline password are available to the web application's JavaScript during the session, but are discarded as soon as the web browser terminates or the session ends. In some examples, reading (data access) includes retrieving the encrypted data item from storage, and transparently decrypting the encrypted data item using the chosen key to provide the data item (cleartext data item). In some examples, writing (data access) includes encrypting the data item using the chosen key to provide an encrypted data item (ciphertext), which is stored in the storage. In this manner, all sensitive data (e.g., any data that is not public data) is stored in the web browser's storage only in encrypted form.

In some implementations, working offline is possible, if the web application provides offline usage capabilities. During offline usage, access to the web browser's storage is controlled based on the offline password. In some examples, the user is prompted to enter the offline password, the encrypted offline key (ciphertex) is retrieved from the web browser's storage, and, if the offline password is correct, the encrypted offline key is decrypted to provide the offline key (plaintext). The offline key is stored in the web browser's SessionStorage for subsequent use.

If read access to a data item is requested (during the offline scenario), the protection level of the data item is determined from the DPP based on the identifier of the data item. In some examples, if the protection level of the data item is public, the data item is retrieved from storage (e.g., without the need for decryption). In some examples, if the data item is low-protection, the data item is retrieved from storage and is transparently decrypted using the offline key. The data item is passed on to the requesting component and/or otherwise made available to the user. In some examples, if the protection level of the data item is high-protection or medium-protection, access to the data item is denied.

In some examples, if low-protection data is to be written (during the offline scenario), the data item is automatically encrypted with the offline key to provide an encrypted data item (ciphertext), which is stored in the web browser's storage. In some examples, if medium-protection data is to be written (during the offline scenario), the data item is automatically encrypted with the offline key to provide an encrypted data item (ciphertext), which is stored in the web browser's storage. Instead of storing the encrypted data item under the name, which was initially requested by the web application, the encrypted data item is stored using a shadow identifier (e.g., using the suffix "_offline"). In this manner, any unexpected overwriting of existing data is prevented and the update process, discussed in further detail below, can be executed. In some examples, if high-protection data is to be written, access is denied.

In some implementations, data update is performed whenever the web application enters the online mode. In some examples, when the web application enters the online mode, it is checked whether medium-level encrypted data items have been written during offline usage. If this is the case, the data update is performed and includes data gathering, key update, and clean-up. In some examples, during data gathering, all encrypted data items that were written offline are retrieved based on the shadow identifier, and are decrypted using the offline key to provide unencrypted data items (plaintext). In some examples, during key update, all of the decrypted data items are re-encrypted with the master key to provide encrypted data items (ciphertext). The encrypted data items are written back into the storage, this time using their actual data identifiers. In the event that an encrypted data item already exists for a particular identifier (e.g., from previous online use), an application-specific conflict resolution process is executed (e.g., the most recent data item is kept, data items (values) are merged, data items (values) are concatenated). During clean up, all of the encrypted data items having shadow identifiers, which have been updated, are deleted from the web browser's storage. After the data update is performed, all data items are encrypted with their correct key and the data storage is in a consistent state.

In some implementations, the encryption scheme of the present disclosure can be realized using provided either by a JavaScript library, such as the Stanford Javascript Crypto Library (SJCL), or through the standard JavaScript Crypto API. In some examples, to achieve transparent encryption and decryption, function wrapping is used, as described herein. In this manner, after defining the data protection library, everything is transparent and automatic, because the APIs used by the developer do not change from the unprotected case.

Figure 2:
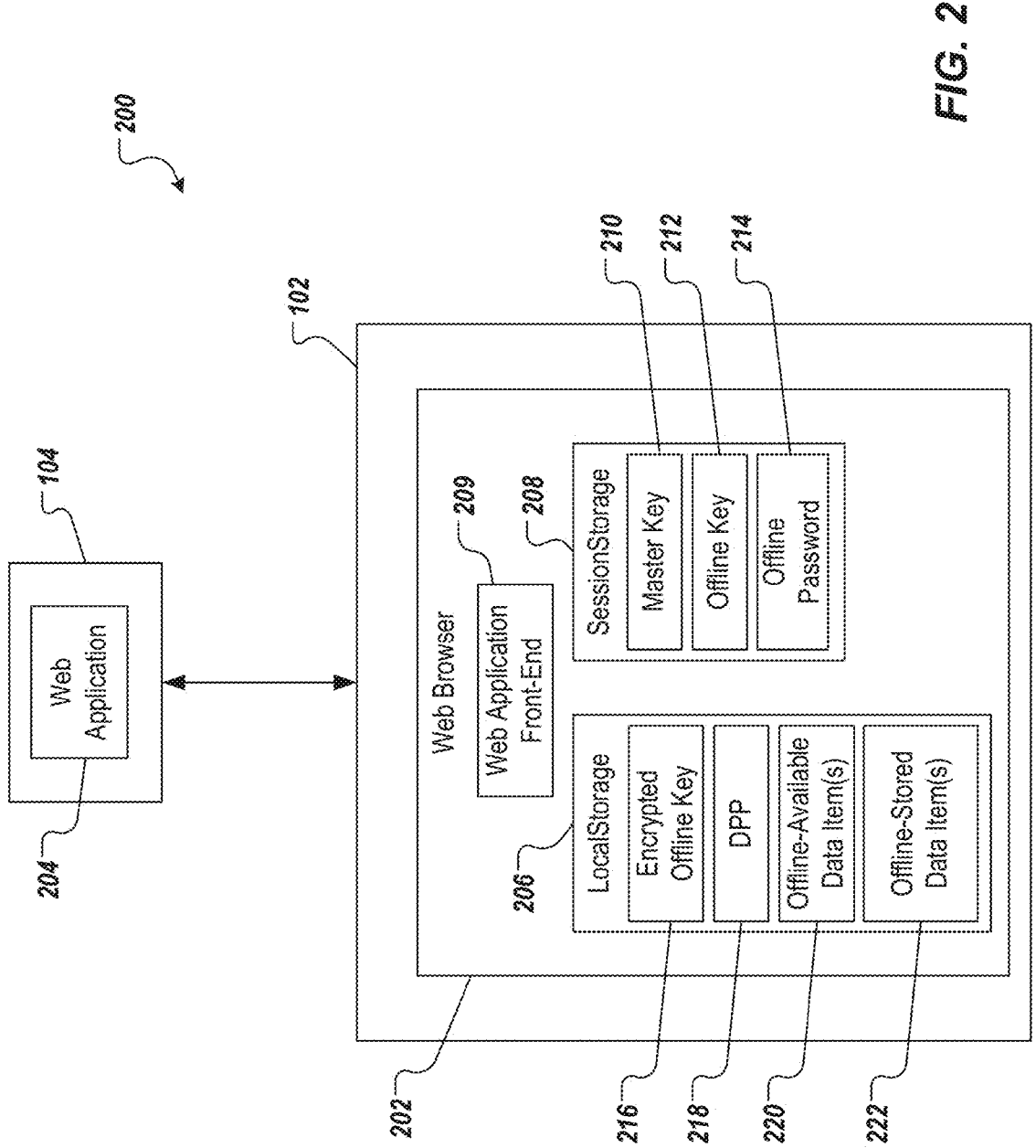
FIG. 2 depicts a schematic architecture in accordance with implementations of the present disclosure.

FIG. 2 depicts a schematic architecture 200 in accordance with implementations of the present disclosure. The example architecture 200 includes the computing device 102 and the server 104 of FIG. 1, which can be in communication with one another (e.g., through the network 106 of FIG. 1). The computing device 102 executes a web browser 202 (e.g., provided as one or more computer-executable programs), and the server 104 hosts and executes a web application 204 (e.g., provided as one or more computer-executable programs). In an online mode, a user of the computing device 102 can interact with the web application 204 using the web browser 202 (e.g., accessing one or more web pages of the web application 204, providing input thereto and receiving output therefrom). For example, a web application front-end 209 (e.g., one or more web pages) can be provided by the web browser 202, which can include one or more interfaces, through which the user can interact with the web application 204. In some examples, the web application front-end 209 includes functionality that can be accessed by the user, while offline.

The web browser 202 includes LocalStorage 206 and SessionStorage 208, both of which are described in further detail above. In some examples, and as described herein, the SessionStorage 208 can store data. In the depicted example, the SessionStorage 208 can store one or more of a master key 210, an offline key 212 and an offline password 214. As discussed herein, upon completion of a respective session, the data is deleted from the SessionStorage 208. For example, the master key 210, the offline key 212 and the offline password 214 can be stored during a session established between the web browser 202 and the web application 204 (during the online mode). In the event that the session ends, the master key 210, the offline key 212 and the offline password 214 are deleted from the SessionStorage 208.

In some examples, and as described herein, the LocalStorage 206 can store data. In some examples, and as described herein, the LocalStorage 206 can store one or more of an encrypted offline key 216, a DPP 218, one or more offline-available data items 220, and one or more offline-stored data items 222. In some examples, the offline-available data items 220 are stored in the LocalStorage and are available when, for example, the user is using functionality provided by the web application front-end 209, when operating offline. In some examples, the offline-available data items 220 include encrypted data items (e.g., encrypted using the offline key) and/or un-encrypted data items (e.g., public data). In some examples, the offline-stored data items 222 include encrypted data items with respective shadow identifiers (e.g., suffixes) and/or encrypted data items without respective shadow identifiers. In some examples, the offline-stored data items 222 include un-encrypted data items (e.g., public data).

In some examples, the encrypted offline key 216 is selectively used to decrypt at least one offline-available data item 220 (e.g., the user requests read access to a low-protection data item while offline). In some examples, the encrypted offline key 216 is used to provide the one or more offline-encrypted data items 222 (e.g., the user writes medium- or low-protection data while offline). In some examples, the offline-encrypted data items 222 are deleted from the LocalStorage (e.g., as part of the update process, when back online).

FIGS. 3-7 are example processes that can be executed in accordance with implementations of the present disclosure.

Figures 3, 4:
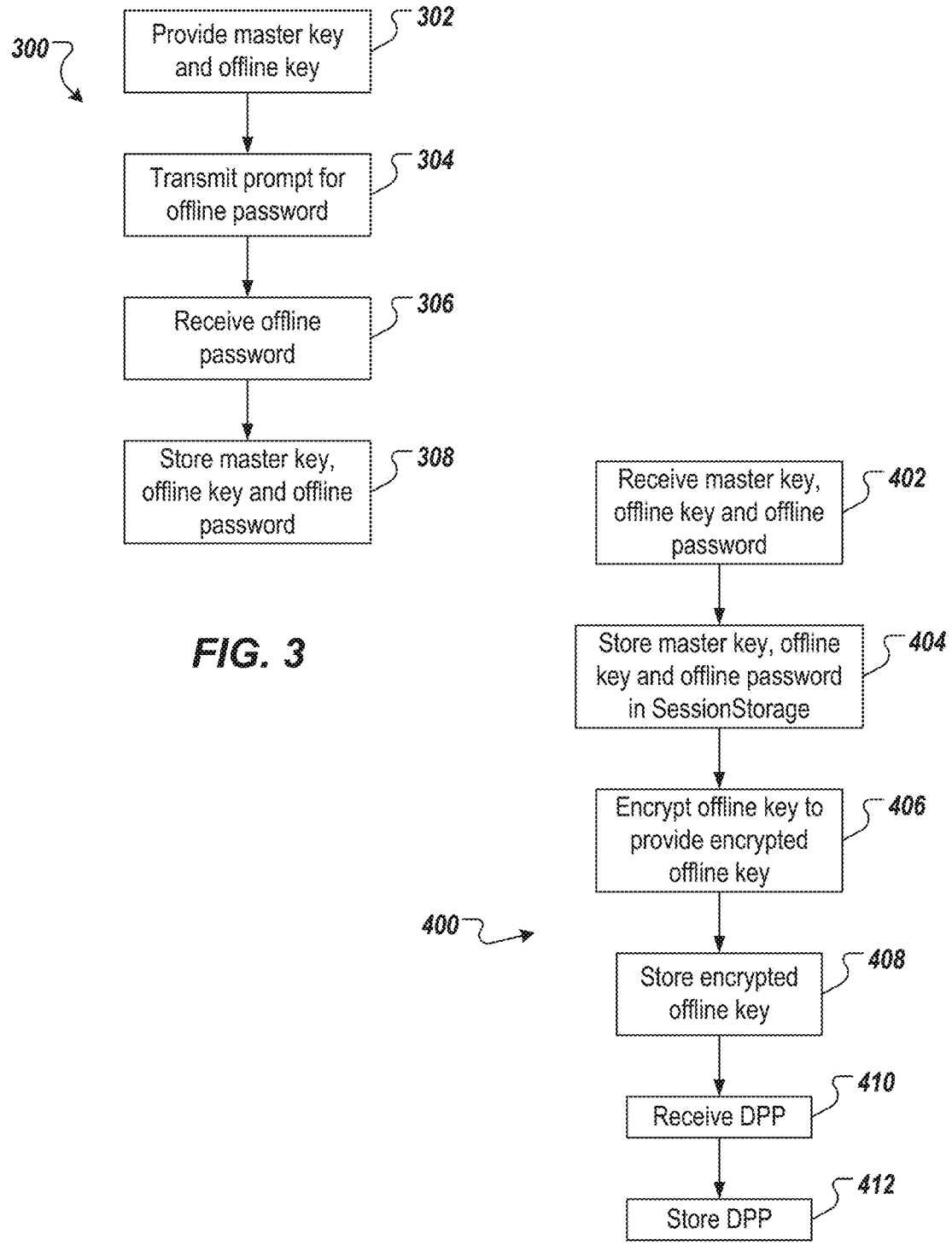
FIGS. 3-7 are example processes that can be executed in accordance with implementations of the present disclosure.

FIG. 3 depicts an example process 300 that can be executed to enroll for use of offline data security in accordance with implementations of the present disclosure. The example process 300 can be implemented, for example, by the example architecture 100 of FIG. 1. In some examples, the example process 300 can be provided by one or more computer-executable programs executed using one or more computing devices. For example, the example process 300, or portions thereof, can be provided by one or more programs executed on a computing device 102 and/or the server 104 of FIG. 1.

In some examples, the example process of FIG. 3 is performed the first time that the user enrolls to access and use the web application. In some examples, the example process of FIG. 3 is performed when the user requests access to a part of the web application that uses the client-side persistence (e.g., that is available offline)

A master key and an offline key are provided (302). For example, a web application that is available in an offline mode can provide the master key and the offline key. A prompt for an offline password is transmitted (304). For example, the web application sends a request to a client-side device for the user to enter an offline password. The offline password is received (306). For example, the web application receives the offline password that the user input to the client-side computing device. The master key, the offline key and the offline password are stored (308). For example, the master key, the offline key and the offline password are stored in a server-side database.

FIG. 4 depicts an example process 400 that can be executed to initialize offline data security in accordance with implementations of the present disclosure. The example process 400 can be implemented, for example, by the example architecture 100 of FIG. 1. In some examples, the example process 400 can be provided by one or more computer-executable programs executed using one or more computing devices. For example, the example process 400, or portions thereof, can be provided by one or more programs executed on a computing device 102 and/or the server 104 of FIG. 1.

A master key, an offline key and an offline password are received (402). For example a web browser receives the master key, the offline key and the offline password from a web application. The master key, the offline key and the offline password are stored in SessionStorage (404). The offline key is encrypted to provide an encrypted offline key (406). For example, the web browser encrypts the offline key using the offline password to provide the encrypted offline key. The encrypted offline key is stored (408). For example, the encrypted offline key is stored in LocalStorage. A DPP is received (410). For example, the web application provides the DPP to the web browser. The DPP is stored (412). For example, the web browser stores the DPP in LocalStorage.

Figure 5:
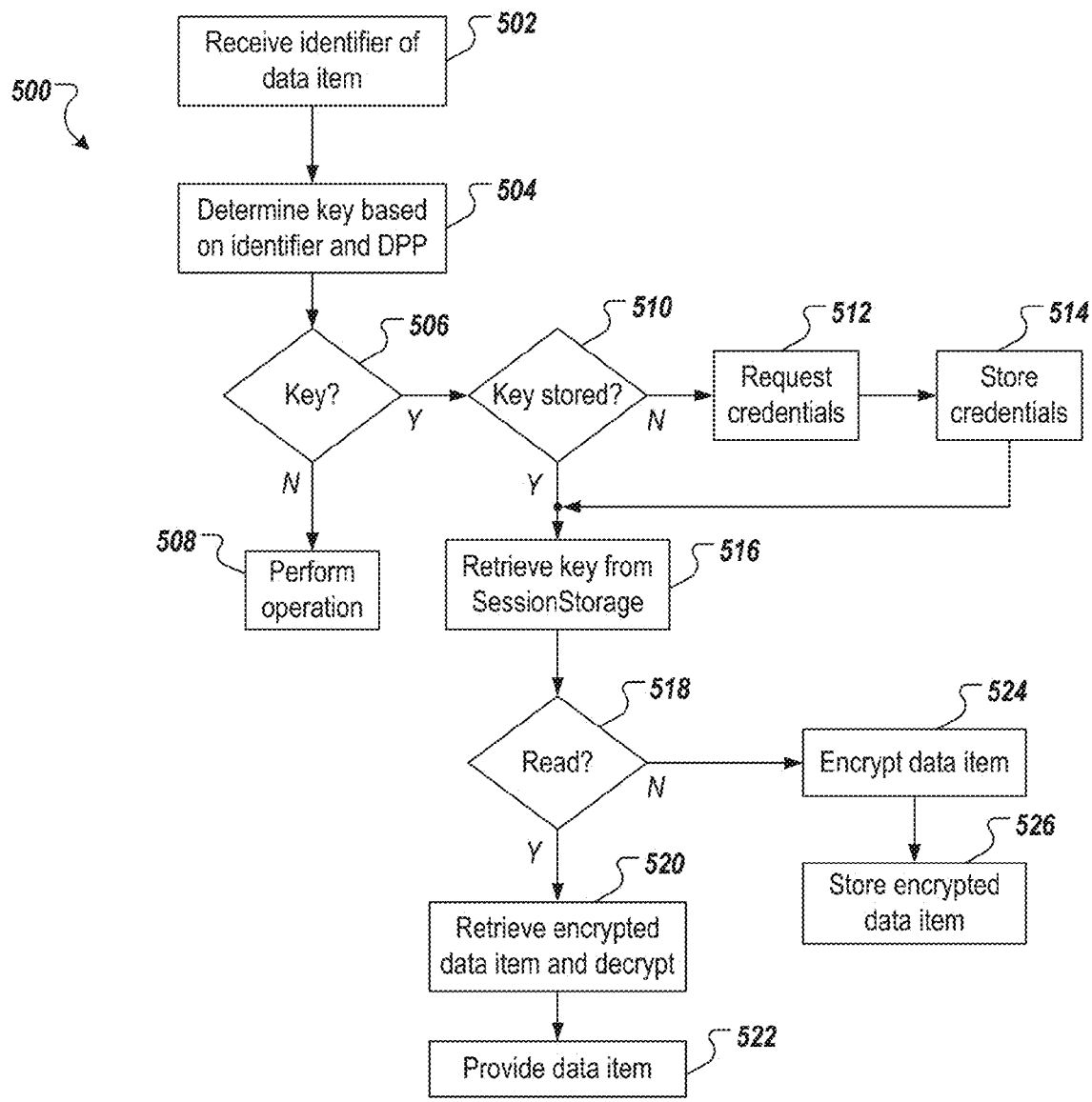

FIG. 5 depicts an example process 500 that can be executed during online operation in accordance with implementations of the present disclosure. The example process 500 can be implemented, for example, by the example architecture 100 of FIG. 1. In some examples, the example process 500 can be provided by one or more computer-executable programs executed using one or more computing devices. For example, the example process 500, or portions thereof, can be provided by one or more programs executed on a computing device 102 and/or the server 104 of FIG. 1.

An identifier of a data item is received (502). For example, the web browser can receive the identifier of a data item that is to be read, written, or otherwise processed as by a user or component requesting the data item. An encryption key is determined based on the identifier and the DPP (504). For example, the web browser cross-references the identifier with the DPP to determine a protection level of the data time and select a corresponding key (e.g., master key, offline key, no key). It is determined whether a key has been selected (506). If a key has not been selected (e.g., the data item corresponds to public data, so no encryption), the data item is available for performance of a requested operation/access (508). If a key has been selected, it is determined whether keys are already stored and available (510). For example, it is determined whether the master key and/or the offline key are already stored in the SessionStorage. If the storage does not have the key(s), credentials are requested (512). For example, the web browser requests a master key, an offline key and an offline password from the web application. The requested credentials are received and stored (514). For example, the credentials are stored in the SessionStorage.

The appropriate key is retrieved from SessionStorage (516). For example, if it is determined that the master key is to be used, the master key is retrieved from SessionStorage, and if it is determined that the offline key is to be used, the offline key is retrieved from SessionStorage. It is determined whether a read operation is to be performed (516). For example, it is determined whether the data item is to be read (e.g., from local storage). If it is determined that a read operation is to be performed, the encrypted data item is retrieved from storage and is decrypted using the selected key (520). For example, the encrypted data item is decrypted using the master key or the offline key to provide an unencrypted data item. The data item is provided (522). For example, the data item is provided for performance of a requested operation/access.

If it is determined that a read operation is to not be performed (e.g., an unencrypted data item is to be written to storage), the unencrypted data item is encrypted using the selected key (524). For example, the unencrypted data item is encrypted using the master key or the offline key to provide an encrypted data item. The encrypted data item is stored (526).

Figure 6:
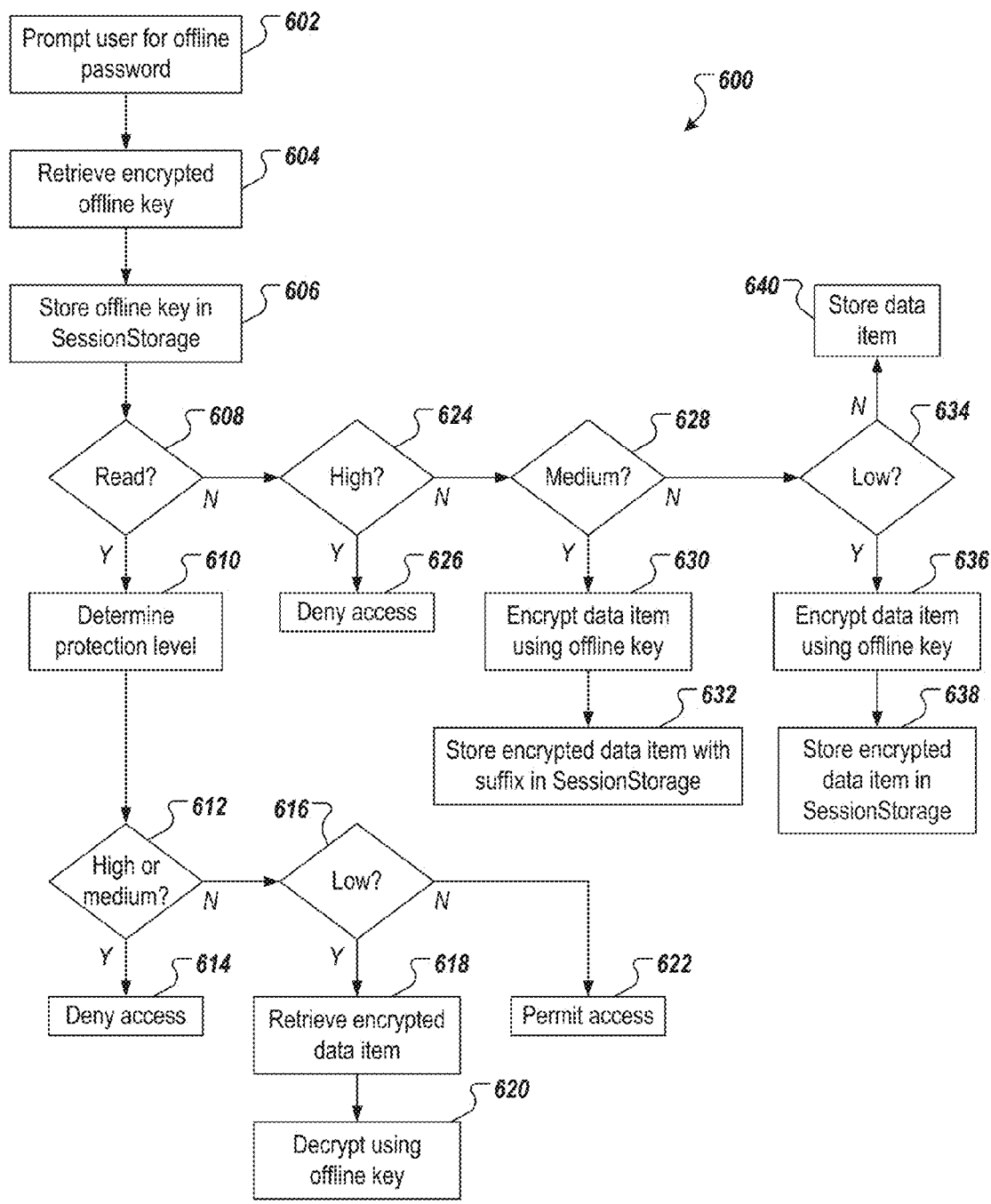

FIG. 6 depicts an example process 600 that can be executed during offline operation in accordance with implementations of the present disclosure. The example process 600 can be implemented, for example, by the example architecture 100 of FIG. 1. In some examples, the example process 600 can be provided by one or more computer-executable programs executed using one or more computing devices. For example, the example process 600, or portions thereof, can be provided by one or more programs executed on a computing device 102 and/or the server 104 of FIG. 1.

The user is prompted for an offline password (602). For example, in response to the user requesting access to or operations on (e.g., read/write) a data item during offline operation, the web application (e.g., web application front-end) can prompt the user for the offline password. The encrypted offline key is retrieved (604). For example, the web browser retrieves the encrypted offline key from LocalStorage. The encrypted offline key is decrypted using the password to provide the offline key, which is stored in SessionStorage (606).

It is determined whether the requested operation is a read operation (608). If the requested operation is a read operation, the protection level of the implicated data item is determined (610). For example, the web browser determined the protection level based on the identifier of the data item and the DPP. It is determined whether the protection level is high-protection or medium-protection (612). If the protection level is high-protection or medium-protection, access to the data item is denied (614). If the protection level is neither high-protection nor medium-protection, it is determined whether the protection level is low-protection (616). If the protection level is low-protection, the encrypted data item is retrieved (e.g., from LocalStorage) (618), and is decrypted using the offline key to provide an unencrypted data item (620).

If the requested operation is not a read operation, it is determined whether the protection level of the implicated data item is high-protection (624). If the protection level is high-protection, access to the data item is denied (626). If the protection level is not high-protection, it is determined whether the protection level is medium-protection (628). If the protection level is medium-protection, the data item is encrypted using the offline key to provide an encrypted data item (630), which is stored with an appended suffix (e.g., shadow identifier) in SessionStorage (632). If the protection level is not medium-protection, it is determined whether the protection level is low-protection (634). If the protection level is low-protection, the data item is encrypted using the offline key to provide an encrypted data item (636), which is stored in SessionStorage (638). If the protection level is not low-protection, the data item is stored (unencrypted) in SessionStorage (640).

Figure 7:
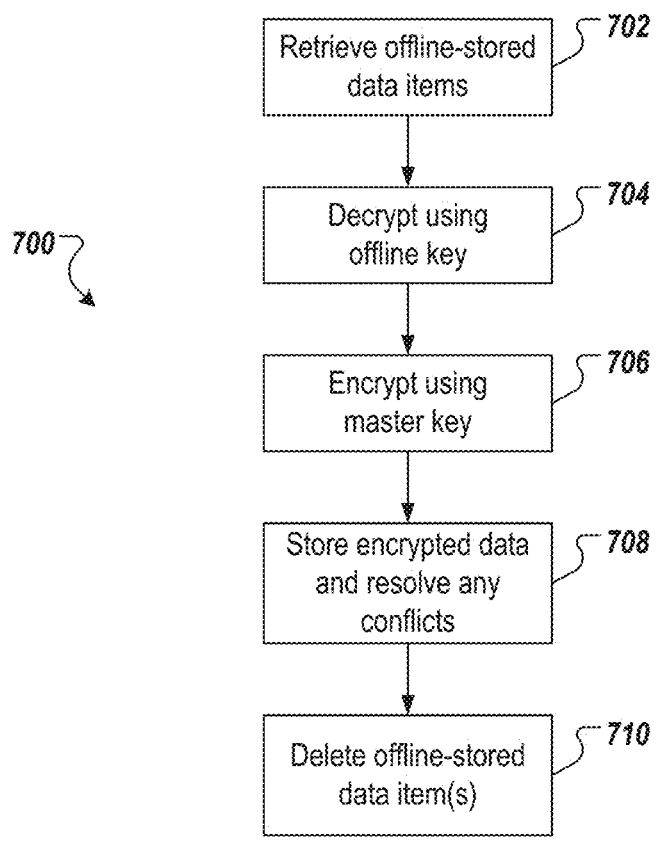

FIG. 7 depicts an example process 700 that can be executed for data updating in accordance with implementations of the present disclosure. The example process 700 can be implemented, for example, by the example architecture 100 of FIG. 1. In some examples, the example process 700 can be provided by one or more computer-executable programs executed using one or more computing devices. For example, the example process 700, or portions thereof, can be provided by one or more programs executed on a computing device 102 and/or the server 104 of FIG. 1. In some examples, the example process 700 is performed when the web application is used in an online mode, subsequent to use in an offline mode.

Offline-stored data items are retrieved (702). For example, the web application requests and receives offline-stored data items from the web browser. Offline-encrypted data items are decrypted using the offline key (704). For example, if the offline-stored data items include offline-encrypted data items (e.g., encrypted while used in the offline mode), the offline-encrypted data items are decrypted by the web application to provide data items (plaintext). The data items are encrypted using the master key (706). For example, the data items, which were decrypted using the offline key, are encrypted by the web application using the master key. The encrypted data items are stored, and any conflicts between data items are resolved (708). For example, the encrypted data items are stored on the server-side, and a conflict resolution protocol (e.g., examples discussed above) is implemented to resolve any conflicts between data items being stored. The offline-stored data items are deleted (710). For example, the web application sends a request to the web browser to delete any offline-stored data items.

Figure 8:
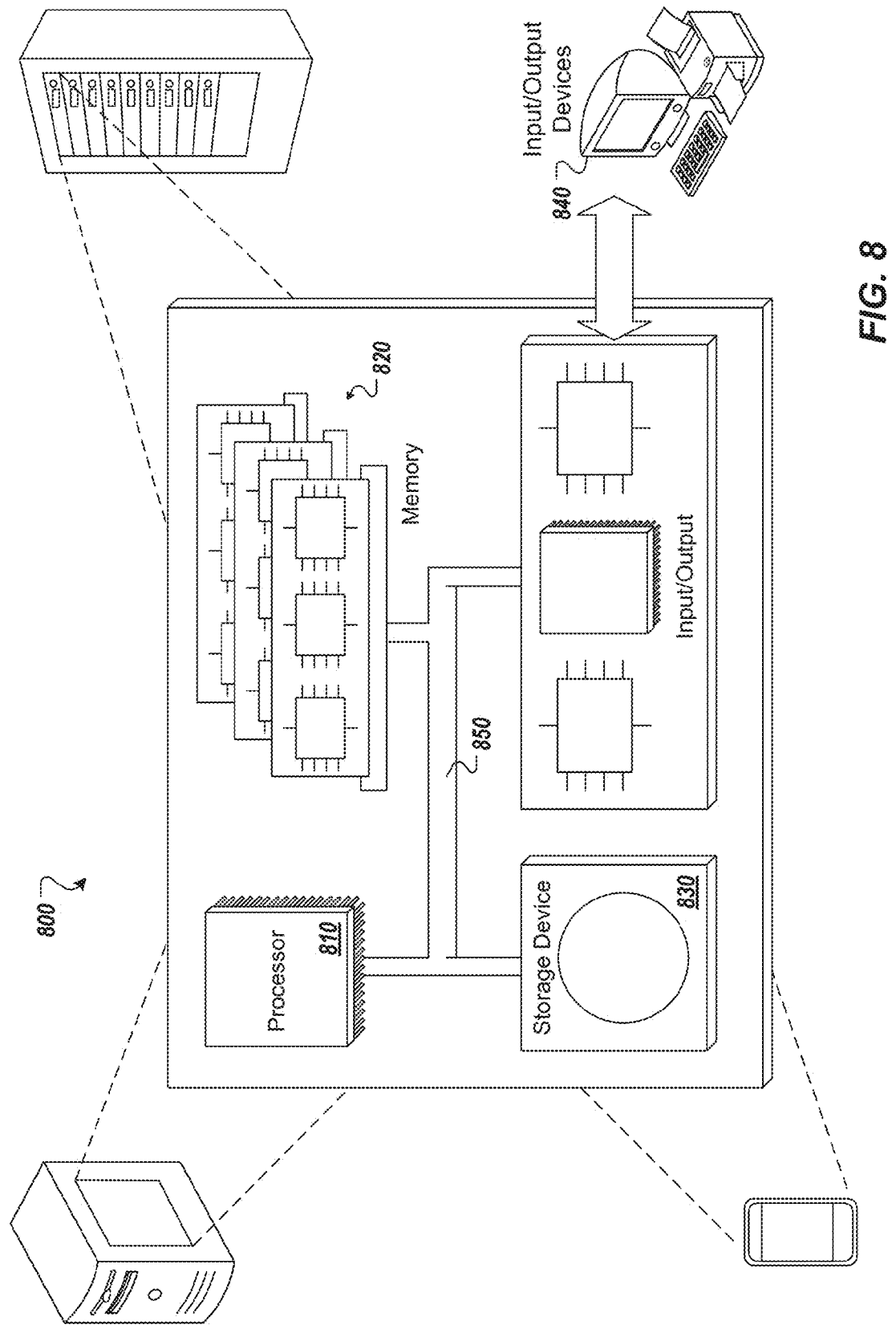
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. Each of the components 810, 820, 830, 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit. The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing data security in web applications operating offline, the method being executed using one or more processors and comprising:

receiving, by the one or more processors, a request from a user of a web application during offline use of the web application in a web browser, the request implicating a data item;

in response to receiving the request of the web application during offline use of the web application, generating, by the one or more processors, a request for an offline password to be provided by the user, the offline password protecting an offline key;

receiving, by the one or more processors, the offline password from the user;

decrypting, by the one or more processors and by using the offline password, an encrypted offline key to provide the offline key that protects new data that is entered during offline use of the web application;

selectively using, by the one or more processors, the offline key to process the data item based on a data protection policy stored in storage of the web browser and a protection level assigned to the data item that is different from an online protection level assigned to the data item; and in response to determining that the data item is to be written to the storage of the web browser and that the protection level of the data item is designed as medium-protection, encrypting the data item using the offline key to provide an encrypted data item, appending a suffix to the encrypted data item, the suffix indicating that the encrypted data item is written during offline use of the web application, and storing the encrypted data item with the suffix in the storage.

2. The method of claim 1, wherein selectively using the offline key comprises:

determining that the data item is to be written to the storage of the web browser and that the protection level of the data item is designated as low-protection, and in response:

encrypting the data item using the offline key to provide an encrypted data item; and storing the encrypted data item in the storage.

3. The method of claim 1, wherein selectively using the offline key comprises:

determining that the data item is to be written to the storage of the web browser and that the protection level of the data item is designated as public, and in response:

storing the data item in the storage.

4. The method of claim 1, wherein selectively using the offline key comprises:

determining that the data item is to be read from the storage of the web browser and that the protection level of the data item is designated as low-protection, and in response:

retrieving an encrypted data item from the storage; and decrypting the encrypted data item using the offline key to provide the data items.

5. The method of claim 1, wherein, during an online use of the web application, the offline key is received from a server hosting the web application, the offline key is encrypted using the offline password to provide the encrypted offline key, and the encrypted offline key is stored in the storage of the web browser.

6. The method of claim 1, further comprising receiving the data protection policy from a server hosting the web application, the data protection policy defining respective protection levels assigned to respective data items.

7. A non-transitory computer-readable storage medium coupled to one or more processors and having instructions stored thereon which, when executed by the one or more processors, cause the one or more processors to perform operations for providing data security in web applications operating offline, the operations comprising:

receiving a request from a user of a web application during offline use of the web application in a web browser, the request implicating a data item;

in response to receiving the request of the web application during offline use of the web application, generating a request for an offline password to be provided by the user, the offline password protecting an offline key;

receiving the offline password from the user;

decrypting by using the offline password an encrypted offline key to provide the offline key that protects new data that is entered during offline use of the web application;

selectively using the offline key to process the data item based on a data protection policy stored in storage of the web browser and a protection level assigned to the data item that is different from an online protection level assigned to the data item; and in response to determining that the data item is to be written to the storage of the web browser and that the protection level of the data item is designed as medium-protection, encrypting the data item using the offline key to provide an encrypted data item, appending a suffix to the encrypted data item, the suffix indicating that the encrypted data item is written during offline use of the web application, and storing the encrypted data item with the suffix in the storage.

8. The computer-readable storage medium of claim 7, wherein selectively using the offline key comprises:

determining that the data item is to be written to the storage of the web browser and that the protection level of the data item is designated as low-protection, and in response:

encrypting the data item using the offline key to provide an encrypted data item; and storing the encrypted data item in the storage.

9. The computer-readable storage medium of claim 7, wherein selectively using the offline key comprises:

determining that the data item is to be written to the storage of the web browser and that the protection level of the data item is designated as public, and in response:

storing the data item in the storage.

10. The computer-readable storage medium of claim 7, wherein selectively using the offline key comprises:

determining that the data item is to be read from the storage of the web browser and that the protection level of the data item is designated as low-protection, and in response:

retrieving an encrypted data item from the storage; and decrypting the encrypted data item using the offline key to provide the data items.

11. The computer-readable storage medium of claim 7, wherein, during an online use of the web application, the offline key is received from a server hosting the web application, the offline key is encrypted using the offline password to provide the encrypted offline key, and the encrypted offline key is stored in the storage of the web browser.

12. The computer-readable storage medium of claim 7, further comprising receiving the data protection policy from a server hosting the web application, the data protection policy defining respective protection levels assigned to respective data items.

13. A system, comprising:
a client-side computing device; and
a computer-readable storage device coupled to the client-side computing device and having instructions stored thereon which, when executed by the client-side computing device, cause the client-side computing device to perform operations for providing data security in web applications operating offline, the operations comprising:
receiving a request from a user of a web application during offline use of the web application in a web browser, the request implicating a data item;
in response to receiving the request of the web application during offline use of the web application, generating a request for an offline password to be provided by the user, the offline password protecting an offline key;
receiving the offline password from the user;
decrypting by using the offline password an encrypted offline key to provide the offline key that protects new data that is entered during offline use of the web application;
selectively using the offline key to process the data item based on a data protection policy stored in storage of the web browser and a protection level assigned to the data item that is different from an online protection level assigned to the data item; and
in response to determining that the data item is to be written to the storage of the web browser and that the protection level of the data item is designed as medium-protection, encrypting the data item using the offline key to provide an encrypted data item, appending a suffix to the encrypted data item, the suffix indicating that the encrypted data item is written during offline use of the web application, and storing the encrypted data item with the suffix in the storage.

14. The system of claim 13, wherein selectively using the offline key comprises:
determining that the data item is to be written to the storage of the web browser and that the protection level of the data item is designated as low-protection, and in response:
encrypting the data item using the offline key to provide an encrypted data item; and
storing the encrypted data item in the storage.

15. The system of claim 13, wherein selectively using the offline key comprises:
determining that the data item is to be written to the storage of the web browser and that the protection level of the data item is designated as public, and in response:
storing the data item in the storage.

16. The system of claim 13, wherein selectively using the offline key comprises:
determining that the data item is to be read from the storage of the web browser and that the protection level of the data item is designated as low-protection, and in response:
retrieving an encrypted data item from the storage; and
decrypting the encrypted data item using the offline key to provide the data items.

17. The system of claim 13, wherein, during an online use of the web application, the offline key is received from a server hosting the web application, the offline key is encrypted using the offline password to provide the encrypted offline key, and the encrypted offline key is stored in the storage of the web browser.

* * * * *